(12) United States Patent
Park et al.

(10) Patent No.: US 11,382,111 B2
(45) Date of Patent: Jul. 5, 2022

(54) METHOD FOR REPORTING APERIODIC CHANNEL STATE INFORMATION IN WIRELESS COMMUNICATION SYSTEM AND APPARATUS THEREFOR

(71) Applicant: LG ELECTRONICS INC., Seoul (KR)

(72) Inventors: Haewook Park, Seoul (KR); Jiwon Kang, Seoul (KR); Kijun Kim, Seoul (KR); Kunil Yum, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 186 days.

(21) Appl. No.: 16/763,548

(22) PCT Filed: Nov. 13, 2018

(86) PCT No.: PCT/KR2018/013832
§ 371 (c)(1),
(2) Date: May 12, 2020

(87) PCT Pub. No.: WO2019/093866
PCT Pub. Date: May 16, 2019

(65) Prior Publication Data
US 2020/0367267 A1 Nov. 19, 2020

Related U.S. Application Data

(60) Provisional application No. 62/587,434, filed on Nov. 16, 2017, provisional application No. 62/585,469, filed on Nov. 13, 2017.

(51) Int. Cl.
*H04W 72/12* (2009.01)

(52) U.S. Cl.
CPC ... *H04W 72/1247* (2013.01); *H04W 72/1268* (2013.01)

(58) Field of Classification Search
CPC ............. H04W 72/12; H04W 72/1268; H04W 72/1247; H04W 72/10; H04L 27/2646; H04L 1/00; H04L 5/00
See application file for complete search history.

(56) References Cited

U.S. PATENT DOCUMENTS

2012/0220286 A1* 8/2012 Chen ................. H04W 24/10
455/422.1

FOREIGN PATENT DOCUMENTS

WO 2016/122109 8/2016

OTHER PUBLICATIONS

PCT International Application No. PCT/KR2018/013832, International Search Report dated March 8, 2019, 3 pages.
(Continued)

*Primary Examiner* — Anez C Ebrahim
(74) *Attorney, Agent, or Firm* — Lee Hong Degerman Kang Waimey

(57) ABSTRACT

The present specification provides a method for reporting aperiodic channel state information (ACSI) in a wireless communication system. More specifically, the method, which is performed by a terminal, comprises the steps of: receiving, from a base station, downlink control information (DCI) including a reporting trigger for each of first ACSI and second ACSI and a reporting timing for each of the first ACSI and the second ACSI; and transmitting low-priority ACSI, which is determined among the first ACSI and the second ACSI on the basis of a predetermined rule, to the base station at a reporting time point determined on the basis of a delayed reporting timing.

3 Claims, 9 Drawing Sheets

(56) References Cited

OTHER PUBLICATIONS

Ericsson, "On remaining details of CSI reporting," 3GPP TSG RAN WG1 Meeting 90bis, R1-1718432, Prague, CZ, Oct. 9-13, 2017, 13 pages.
Huawei et al., "Details of CSI reporting on PUCCH/PUSCH," 3GPP TSG RAN WG1 Meeting 90bis, R1-1717300, Prague, Czech Republic, Oct. 9-13, 2017, 3 pages.
LG Electronics Inc., "Discussion on CSI reporting," 3GPP TSG RAN WG1 90bis, R1-1717940, Prague, CZ, Oct. 9-13, 2017, 8 pages.
MediaTek Inc., "Remaining details for CSI reporting," 3GPP TSG RAN WG1 90bis, R1-1718337, Prague, CZ, Oct. 9-13, 2017, 10 pages.

* cited by examiner

[Figure 1]
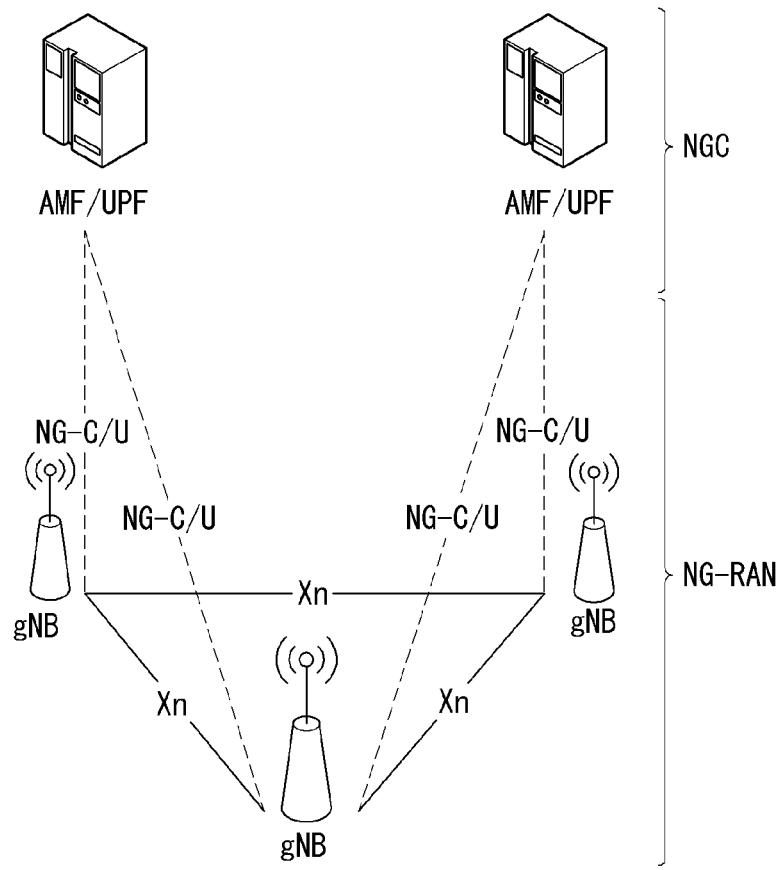
[Figure 2]
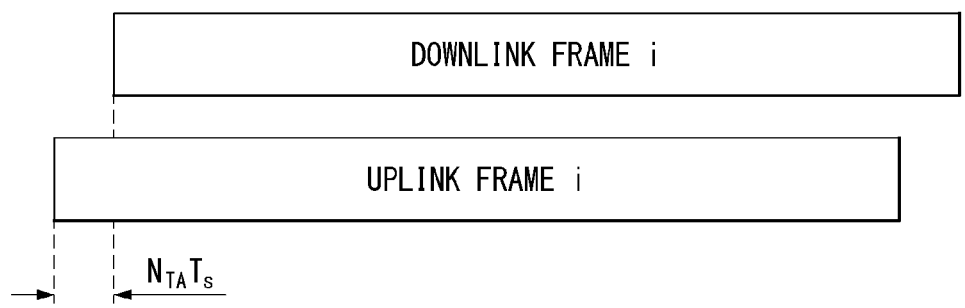

[Figure 3]
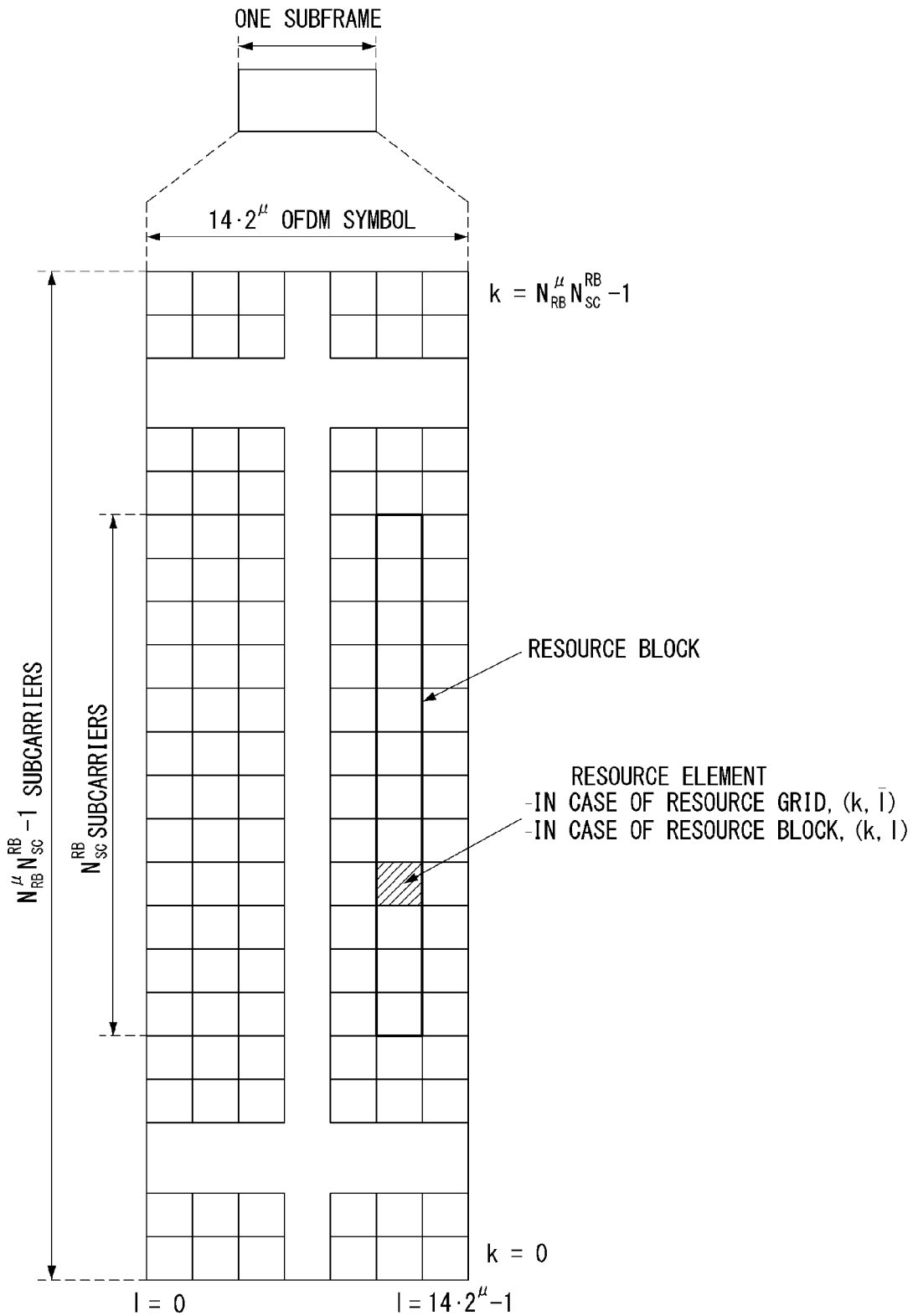

[Figure 4]
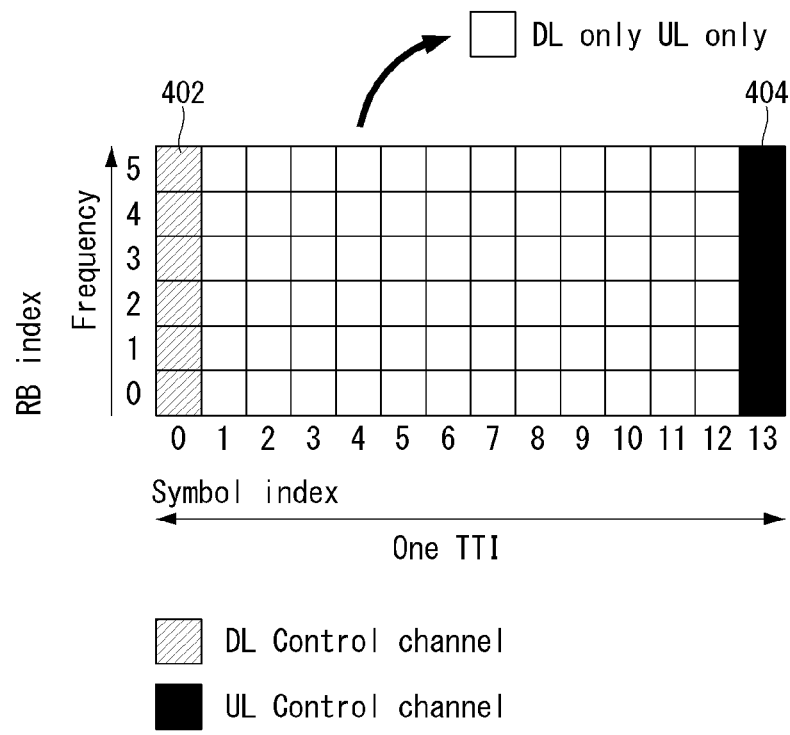
[Figure 5]
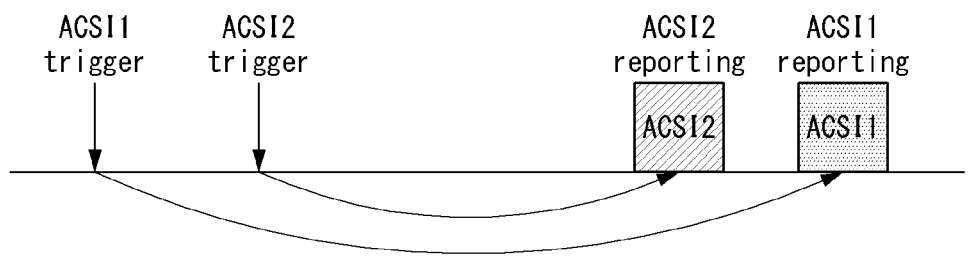

[Figure 6]

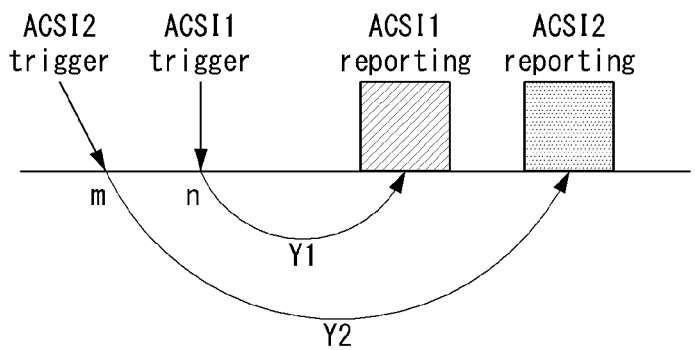

[Figure 7]

| Box #0 Part 2 WB CSI for CSI report #1 Part 2 WB CSI for CSI report #2 ... Part 2 WB CSI for CSI report #N | Box #1 Part 2 SB CSI of even SBs for CSI report #1 | Box #2 Part 2 SB CSI of odd SBs for CSI report #1 | Box #3 Part 2 SB CSI of even SBs for CSI report #2 | Box #4 Part 2 SB CSI of odd SBs for CSI report #2 | ... | Box #2N-1 Part 2 SB CSI of even SBs for CSI report #N | Box #2N Part 2 SB CSI of odd SBs for CSI report #N |

High priority → Low priority

[Figure 8]
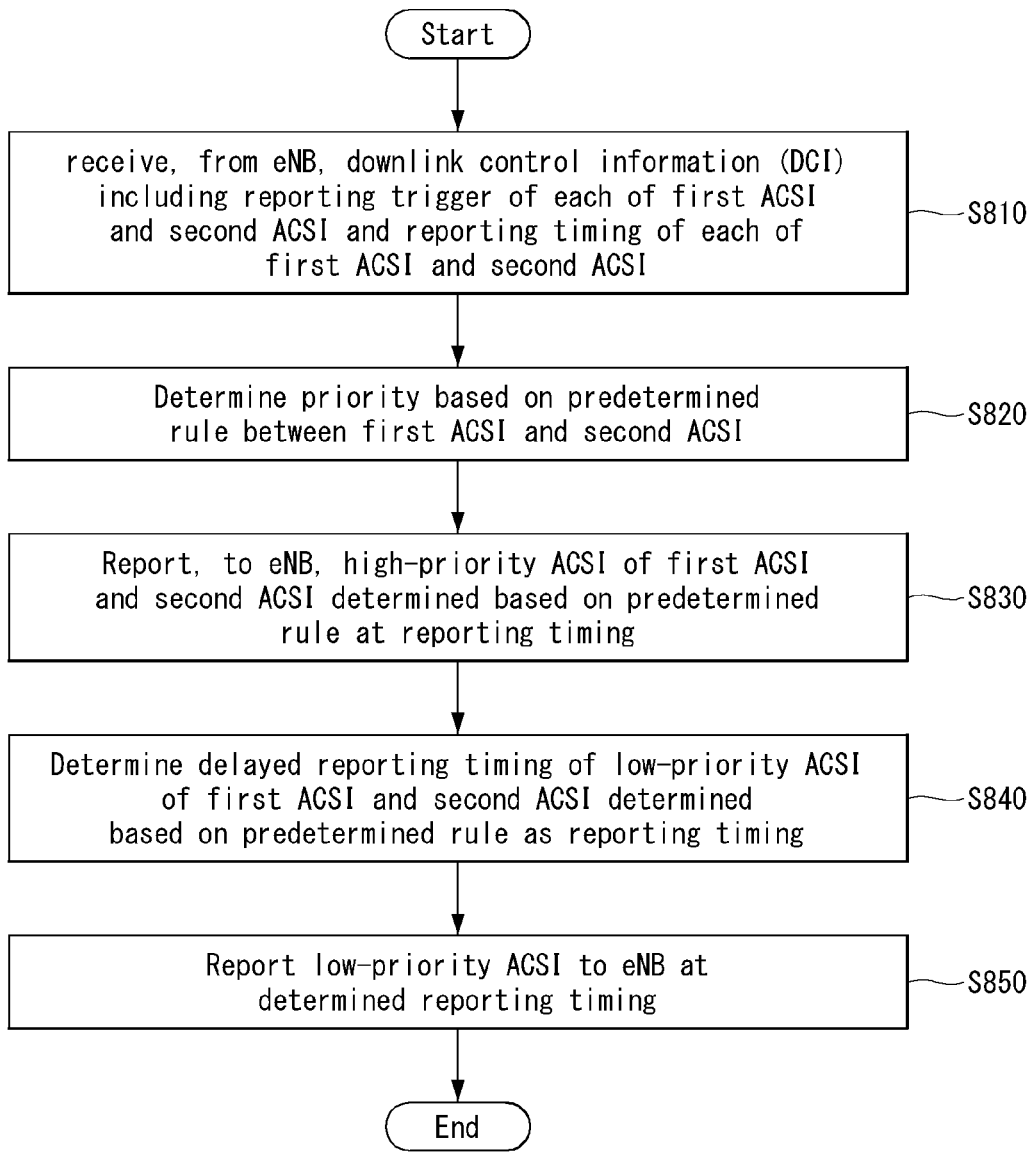

[Figure 9]
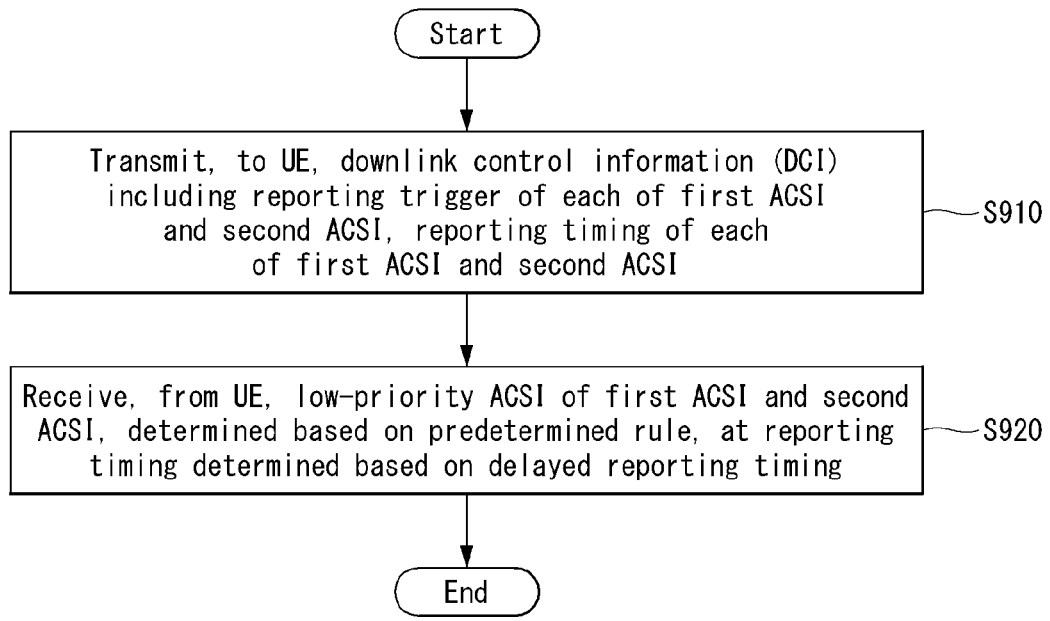
[Figure 10]
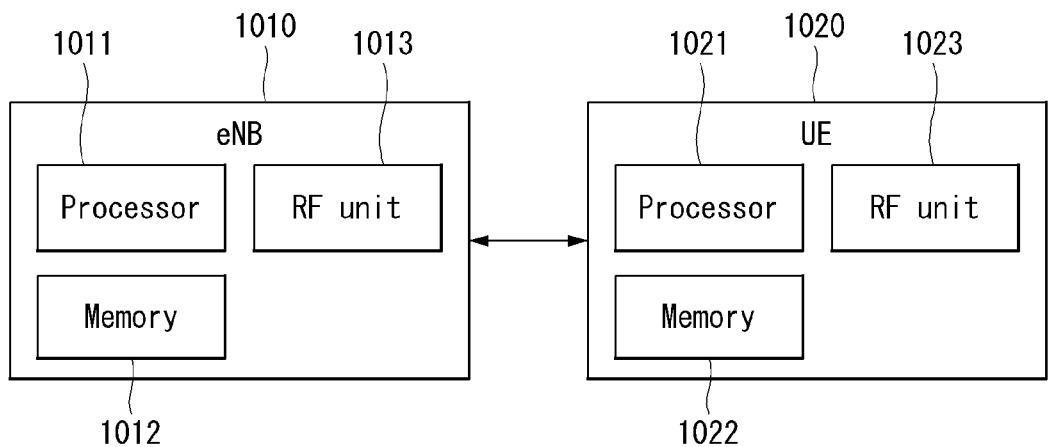

[Figure 11]
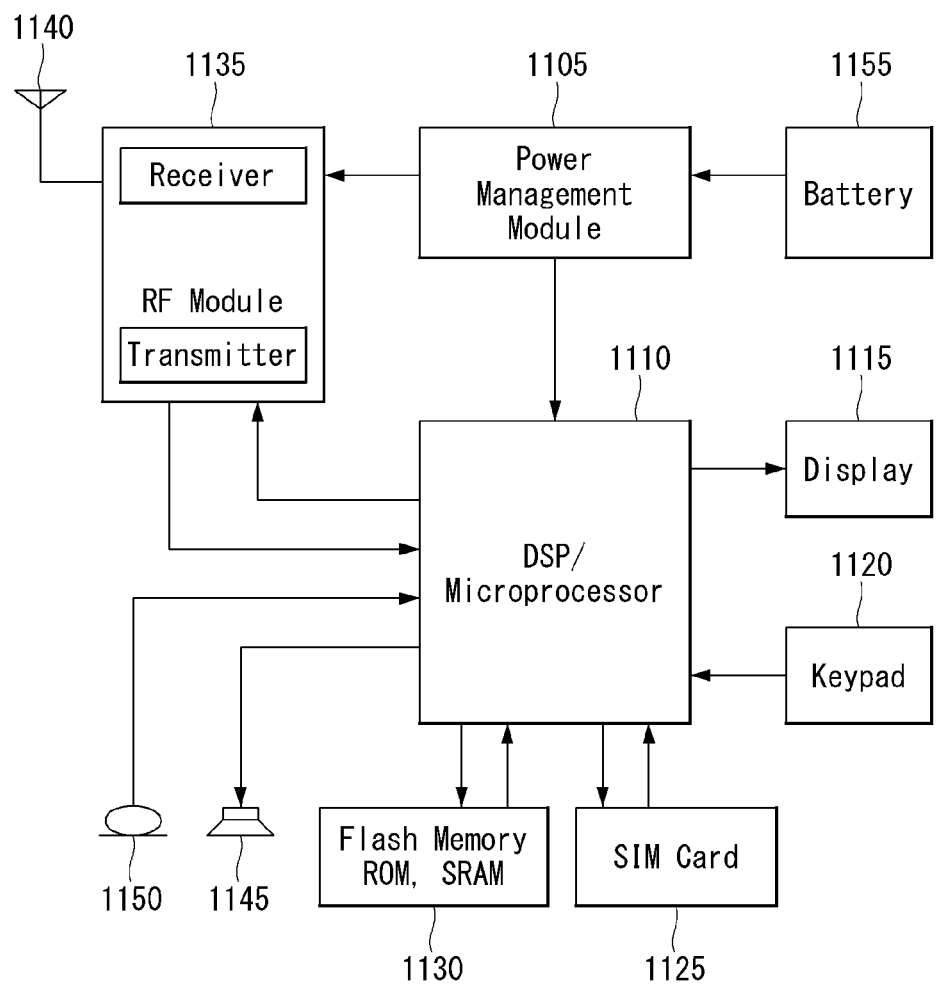

[Figure 12]
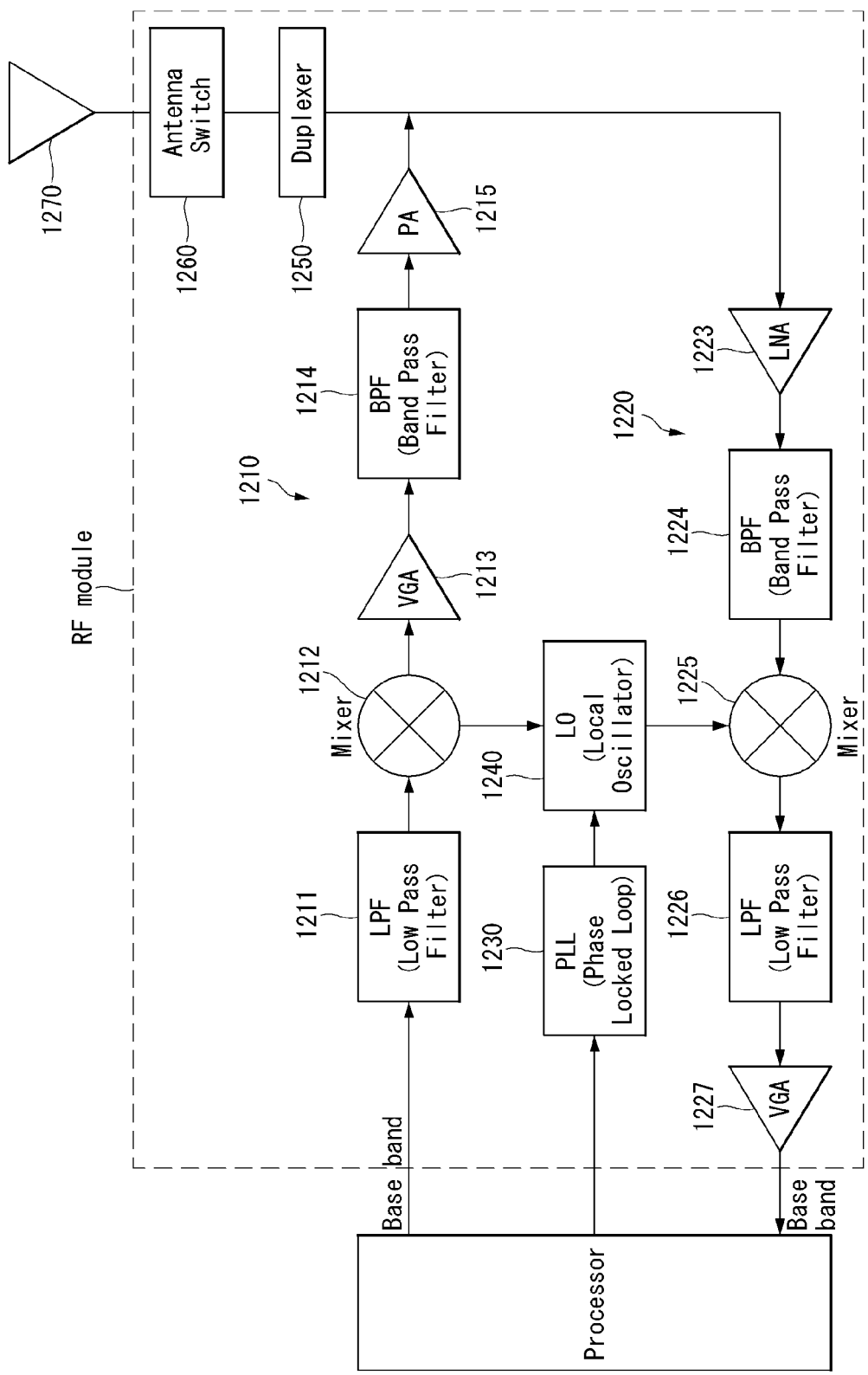

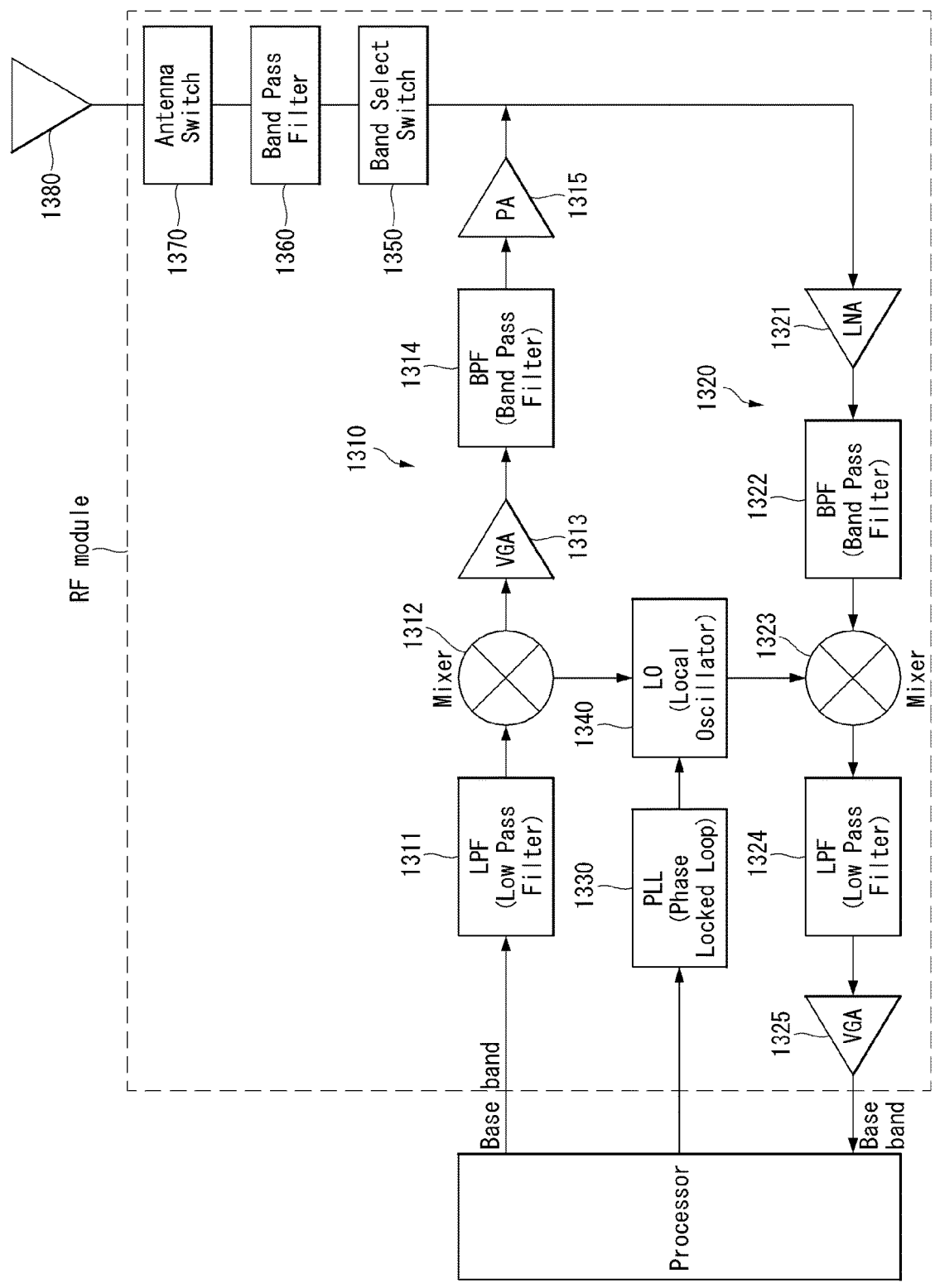
[Figure 13]

METHOD FOR REPORTING APERIODIC CHANNEL STATE INFORMATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/013832, filed on Nov. 13, 2018, which claims the benefit of U.S. Provisional Application No. 62/585,469, filed on Nov. 13, 2017, and 62/587,434, filed on Nov. 16, 2017, the contents of which are all hereby incorporated by reference herein in their entirety.

TECHNICAL FIELD

The present disclosure relates to a wireless communication system and, more particularly, to a method of reporting aperiodic channel state information (ACSI) and an apparatus supporting the same.

BACKGROUND ART

A mobile communication system has been developed to provide a voice service while ensuring the activity of a user. However, the area of the mobile communication system has extended to data services in addition to voice services. Today, resources are insufficient due to an explosive increase in traffic, and users demand a higher speed service. As a result, a more advanced mobile communication system is necessary.

Requirements for a next-generation mobile communication system should be able to support the accommodation of explosive data traffic, a dramatic increase in the data rate per use, the accommodation of a significant increase in the number of connected devices, very low end-to-end latency, and high-energy efficiency. To this end, various technologies are researched, including dual connectivity, massive multiple input multiple output (MIMO), in-band full duplex, non-orthogonal multiple access (NOMA), super wideband support, and device networking.

DISCLOSURE

Technical Problem

The present disclosure provides a method of reporting aperiodic channel state information.

Furthermore, the present disclosure provides a method of determining the priorities of a plurality of aperiodic CSI triggers.

Furthermore, the present disclosure provides a method of determining reporting timing of a plurality of pieces of aperiodic CSI.

The technical problems to be achieved by the present disclosure are not limited to the above-mentioned technical problems and any other technical problems that are not mentioned may be clearly understood by those skilled in the art to which the present disclosure pertains from the following descriptions.

Technical Solution

The present disclosure provides a method of reporting aperiodic channel state information (ACSI) in a wireless communication system.

Specifically, the method performed by a terminal includes receiving, from a base station, downlink control information (DCI) including the reporting trigger of each of first ACSI and second ACSI and reporting timing of each of the first ACSI and second ACSI; determining a priority based on a predetermined rule between the first ACSI and the second ACSI; reporting, to the base station, high-priority ACSI of the first ACSI and second ACSI determined based on the predetermined rule based on the reporting timing; determining, as reporting timing, timing at which the reporting timing of low-priority ACSI of the first ACSI and second ACSI determined based on the predetermined rule has been delayed; reporting the low-priority ACSI to the base station at the determined reporting timing. The reporting timing of each of the first ACSI and the second ACSI indicates time up to a subframe or slot in which a physical uplink shared channel (PUSCH) for reporting ACSI is transmitted based on a subframe or slot in which the reporting trigger of each of the first ACSI and the second ACSI is received.

Furthermore, in the present disclosure, the determined reporting timing is determined by adding the reporting timing of the high-priority ACSI of the first ACSI and the second ACSI to the reporting timing of low-priority ACSI of the first ACSI and the second ACSI based on a subframe or slot in which the reporting trigger of the low-priority ACSI is received.

Furthermore, in the present disclosure, the determined reporting timing is determined by adding the reporting timing of low-priority ACSI of the first ACSI and the second ACSI from timing at which the reporting of the high-priority ACSI of the first ACSI and the second ACSI is ended.

Furthermore, in the present disclosure, the determined reporting timing is determined by adding an offset value to the reporting timing of low-priority ACSI of the first ACSI and the second ACSI from timing at which the reporting of the high-priority ACSI of the first ACSI and the second ACSI is ended.

Furthermore, in the present disclosure, the offset value is a predefined value.

Furthermore, in the present disclosure, a terminal performing a method of reporting aperiodic channel state information (ACSI) in a wireless communication system includes a radio frequency (RF) module for transmitting and receiving radio signals and a processor functionally connected to the RF module. The processor is configured to receive, from a base station, downlink control information (DCI) including the reporting trigger of each of first ACSI and second ACSI and reporting timing of each of the first ACSI and second ACSI; determine a priority based on a predetermined rule between the first ACSI and the second ACSI; report, to the base station, high-priority ACSI of the first ACSI and second ACSI determined based on the predetermined rule based on the reporting timing; determine, as reporting timing, timing at which the reporting timing of low-priority ACSI of the first ACSI and second ACSI determined based on the predetermined rule has been delayed; report the low-priority ACSI to the base station at the determined reporting timing. The reporting timing of each of the first ACSI and the second ACSI indicates time up to a subframe or slot in which a physical uplink shared channel (PUSCH) for reporting ACSI is transmitted based on a subframe or slot in which the reporting trigger of each of the first ACSI and the second ACSI is received.

Furthermore, in the present disclosure, the determined reporting timing is determined by adding the reporting timing of the high-priority ACSI of the first ACSI and the second ACSI to the reporting timing of low-priority ACSI of the first ACSI and the second ACSI based on a subframe or slot in which the reporting trigger of the low-priority ACSI is received.

Furthermore, in the present disclosure, the determined reporting timing is determined by adding the reporting timing of low-priority ACSI of the first ACSI and the second ACSI from timing at which the reporting of the high-priority ACSI of the first ACSI and the second ACSI is ended.

Furthermore, in the present disclosure, the determined reporting timing is determined by adding an offset value to the reporting timing of low-priority ACSI of the first ACSI and the second ACSI from timing at which the reporting of the high-priority ACSI of the first ACSI and the second ACSI is ended.

Furthermore, in the present disclosure, the offset value is a predefined value.

Furthermore, in the present disclosure, in a method of reporting aperiodic channel state information (ACSI) in a wireless communication system, the method performed by a base station includes transmitting, to a terminal, downlink control information (DCI) including the reporting trigger of each of first ACSI and a second ACSI and reporting timing of each of the first ACSI and the second ACSI; and receiving, from the terminal, low-priority ACSI of the first ACSI and second ACSI determined based on a predetermined rule at reporting timing determined based on delayed reporting timing.

Advantageous Effects

The present disclosure has an effect in that a collision can be avoided if a plurality of ACSI reporting timing is triggered in one UE.

It will be appreciated by persons skilled in the art that that the effects that could be achieved with the present disclosure are not limited to what has been particularly described hereinabove and other advantages of the present disclosure will be more clearly understood by a person skilled in the art to which the present disclosure pertains, from the following detailed description.

DESCRIPTION OF DRAWINGS

The accompany drawings, which are included as part of the detailed description in order to help understanding of the present disclosure, provide embodiments of the present disclosure and describe the technical characteristics of the present disclosure along with the detailed description.

FIG. 1 is a diagram showing an example of a general system configuration of NR to which a method proposed in the present disclosure may be applied.

FIG. 2 shows a relation between an uplink frame and a downlink frame in a wireless communication system to which a method proposed in the present disclosure may be applied.

FIG. 3 shows an example of a resource grid supplied in a wireless communication system to which a method proposed in the present disclosure may be applied.

FIG. 4 illustrates an example of a self-contained subframe structure to which a method proposed in the present disclosure may be applied.

FIG. 5 is a diagram illustrating an example of a case where ACSI reporting timing is mismatched.

FIG. 6 is a diagram illustrating an example of a case where ACSI reporting timing is delayed, which is proposed in the present disclosure.

FIG. 7 is a diagram illustrating an example of priorities for CSI reporting.

FIG. 8 is a diagram illustrating an example of an operating method of a UE reporting aperiodic CSI, which is proposed in the present disclosure.

FIG. 9 is a diagram illustrating an example of an operating method of a base station receiving aperiodic CSI, which is proposed in the present disclosure.

FIG. 10 illustrates a block diagram of a wireless communication apparatus to which methods proposed in the present disclosure may be applied.

FIG. 11 illustrates a block diagram of a communication apparatus according to an embodiment of the present disclosure.

FIG. 12 is a diagram illustrating an example of the RF module of a wireless communication apparatus to which a method proposed in the present disclosure may be applied.

FIG. 13 is a diagram illustrating another example of the RF module of a wireless communication apparatus to which a method proposed in the present disclosure may be applied.

MODE FOR INVENTION

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with a term, such as a fixed station, a Node B, an evolved-NodeB (eNB), a base transceiver system (BTS), an access point (AP) or a gNB (general NB). Furthermore, a 'terminal' may be fixed or movable and may be replaced with a term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device or a device-to-device (D2D) device.

In the present disclosure, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Furthermore, 5G new radio (NR) defines enhanced mobile broadband (eMBB), massive machine type communications (mMTC), ultra-reliable and low latency communications (URLLC), and vehicle-to-everything (V2X) based on usage scenario.

A 5G NR standard is divided into standalone (SA) and non-standalone (NSA) depending on co-existence between a NR system and a LTE system.

The 5G NR supports various subcarrier spacings and supports CP-OFDM in the downlink and CP-OFDM and DFT-s-OFDM (SC-OFDM) in the uplink.

Embodiments of the present disclosure can be supported by standard documents disclosed in at least one of IEEE 802, 3GPP, and 3GPP2 which are the wireless access systems. That is, steps or parts in embodiments of the present disclosure which are not described to clearly show the technical spirit of the present disclosure can be supported by the standard documents. Furthermore, all terms described in the present disclosure can be described by the standard document.

GPP LTE/LTE-A/New RAT (NR) is primarily described for clear description, but technical features of the present disclosure are not limited thereto.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

General System

FIG. 1 illustrates an example of an overall structure of a NR system to which a method proposed by the present specification is applicable.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to an access and mobility management function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$ and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed by the present disclosure is applicable.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots, \mu}-1\}$ in a subframe, and in ascending order of $n_{s,f}^\mu \in \{0, \ldots, N_{frame}^{slots, \mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subfram}^{slots,\mu}$ | $N_{symb}^\mu$ | $N_{frame}^{slots,\mu}$ | $N_{subfram}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subfram}^{slots,\mu}$ | $N_{symb}^\mu$ | $N_{frame}^{slots,\mu}$ | $N_{subfram}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of Delay spread, Doppler spread, Frequency shift, Average received power, and Received Timing.

FIG. 3 illustrates an example of a resource grid supported in a wireless communication system to which a method proposed by the present disclosure is applicable.

Referring to FIG. 3, a resource grid is composed of $N_{RB}^\mu N_{sc}^{RB}$ subcarriers in a frequency domain, each subframe composed of $14 \cdot 2\mu$ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols. Herein, $N_{RB}^\mu \le N_{RB}^{max, \mu}$. The above $N_{RB}^{max, \mu}$ indicates the maximum transmission bandwidth, and it may change not just between numerologies, but between UL and DL.

In this case, as illustrated in FIG. 3, one resource grid may be configured per the numerology μ and an antenna port p.

Each element of the resource grid for the numerology μ and the antenna port p is indicated as a resource element, and may be uniquely identified by an index pair (k,l). Herein, $k=0, \ldots, N_{RB}^\mu N_{sc}^{RB}-1$ is an index in the frequency domain, and $\bar{l}=0, \ldots, 2^\mu N_{symb}^{(\mu)}-1$ indicates a location of a symbol in a subframe. To indicate a resource element in a slot, the index pair (k,$\bar{l}$) is used, where $l=0, \ldots, N_{symb}^\mu -1$.

The resource element (k,$\bar{l}$) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^\mu-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \qquad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{RB}^\mu-1$ in the frequency region.

Self-Contained Subframe Structure

A time division duplexing (TDD) structure considered in an NR system is a structure in which both uplink (UL) and downlink (DL) are processed in one subframe. This is for minimizing the latency of data transmission in the TDD system, and this structure is referred to as a self-contained subframe structure.

FIG. 4 illustrates an example of a self-contained subframe structure to which a method proposed in the present disclosure may be applied. FIG. 2 is merely for convenience of description, and does not limit the scope of the present disclosure.

Referring to FIG. 4, as in the case of legacy LTE, it is assumed that one subframe is configured with 14 orthogonal frequency division multiplexing (OFDM) symbols.

In FIG. 4, a region 402 means a downlink control region, and a region 404 means an uplink control region. Furthermore, a region (i.e., region not having a separate indication) except the region 402 and the region 404 may be used for the transmission of downlink data or uplink data.

That is, uplink control information and downlink control information are transmitted in one self-contained subframe. In contrast, in the case of data, uplink data or downlink data is transmitted in one self-contained subframe.

If the structure illustrated in FIG. 4 is used, downlink transmission and uplink transmission are sequentially performed within one self-contained subframe. The transmission of downlink data and the reception of uplink ACK/NACK may be performed.

As a result, if an error of data transmission occurs, the time taken up to the retransmission of the data can be reduced. Accordingly, latency related to data transmission can be minimized.

In a self-contained subframe structure such as FIG. 4, there is a need for a time gap for a process of an eNodeB (eNB, gNB) and/or a terminal (user equipment (UE)) switching from a transmission mode to a reception mode or a process of the eNB and/or the UE switching from the reception mode to the transmission mode. In relation to the time gap, if uplink transmission is performed after downlink transmission in the self-contained subframe, some OFDM symbol(s) may be configured as a guard period (GP).

Downlink Channel State Information (CSI) Feedback

In the current LTE standard, there are two transmission methods of open-loop MIMO operated without channel information and closed-loop MIMO.

In the closed-loop MIMO, in order to obtain a multiplexing gain of a MIMO antenna, a transmission/reception stage performs beamforming based on each piece of channel information, that is, CSI.

In order to obtain CSI, an eNB instructs a UE to feed downlink CSI back by allocating a physical uplink control channel (PUCCH) or a physical uplink shared channel (PUSCH) to the UE.

CSI is basically divided into three pieces of information of a rank indicator (RI), a precoding matrix index (PMI), a channel quality indication (CQI).

First, the RI indicates rank information of a channel, and means the number of streams received by a UE through the same frequency time resource.

This value is dominantly determined by long term fading of a channel, and is fed back from a UE to an eNB with a longer period than that of a PMI or CQI value.

Next, the PMI is a value into which the spatial characteristic of a channel has been incorporated, and indicates the precoding index of an eNB preferred by a UE based on metric, such as an SINR.

Next, the CQI is a value indicative of the intensity of a channel, and means a reception SINR which may be obtained when an eNB uses a PMI.

In a more advanced communication system such as LTE-A, to obtain additional multi-user diversity using multi-user MIMO (MU-MIMO) has been added.

To this end, from the viewpoint of channel feedback, higher accuracy is necessary.

The reason for this is that in MU-MIMO, feedback channel accuracy has a great effect on interference of a multiplexed different UE in addition to a UE that has uploaded feedback because an interference channel is present between the multiplexed UEs in an antenna domain.

Accordingly, in LTE-A, in order to increase feedback channel accuracy, it has been determined that the final PMI is divided and designed into W1, that is, a long term and/or wideband, and W2, that is, a short term and/or sub-band PMI.

As an example of a hierarchical codebook transformation method for configuring one final PMI from two pieces of channel information, a codebook is transformed using a long-term covariance matrix of a channel as follows.

$$W = \text{norm}(W1\,W2)_{(1)} \quad [\text{Equation 2}]$$

In Equation 2, W2(=short term PMI) is the codeword of a codebook produced in order to incorporate short-term channel information. W is the codeword of the transformed final codebook. norm(A) means a matrix whose norm for each column of a matrix A has been normalized to 1.

Detailed structures of the existing W1 and W2 are as follows.

$$W1(i) = \begin{bmatrix} X_j & 0 \\ 0 & X_i \end{bmatrix}, \text{ where } X_i \text{ is } Nt/2 \text{ by Matrix.} \quad [\text{Equation 3}]$$

$$W2(j) = \begin{bmatrix} e_M^i & e_M^j & & e_M^\infty \\ & & \cdots & \\ \alpha_j e_M^i & \beta_j e_M^j & & \gamma_j e_M^\infty \end{bmatrix} \overbrace{\phantom{xxxxxxxxxxxxxxx}}^{r\ ooborooc} \text{ (if rank } = r),$$

where $1 \le k, l, m \le M$ and $k, l, m$ are integer.

The codeword structure is a structure designed by incorporating the correlation characteristics of a channel occurring if a cross polarized antenna is used and an interval between the antennas is dense (corresponds to a case where the distance between adjacent antennas is half or less of a signal wavelength).

In the case of a cross polarized antenna, the antenna may be divided into a horizontal antenna group and a vertical antenna group. Each of the antenna groups has the characteristic of a uniform linear array (ULA) antenna, and the two antenna groups have been co-located.

Accordingly, the correlation between the antennas of each group has the same linear phase increment characteristic, and the correlation between antenna groups has a phase-rotated characteristic.

As a result, a codebook is a value obtained by quantizing a channel. Accordingly, it is necessary to design a codebook by incorporating the characteristics of a channel corresponding to a source without any change. For convenience of description, a rank 1 codeword produced to have the structure is taken as an example. It can be seen that such a channel characteristic has been incorporated into a codeword satisfying Equation 3.

$$W1(i) * W2(j) = \begin{bmatrix} X_i(k) \\ \alpha_j X_i(k) \end{bmatrix} \quad [\text{Equation 4}]$$

In Equation 4, a codeword is represented as the vector of Nt (the number of Tx antennas) by 1, and has been structured into two, that is, a higher vector $X_i(k)$ and a lower vector $\alpha_j X_i(k)$, each shows a correlation characteristic between a horizontal antenna group and a vertical antenna group.

It is advantageous to represent $X_i(k)$ as a vector having a linear phase increment by incorporating a correlation characteristic between the antennas of each antenna group. As a representative example, a DFT matrix may be used.

Furthermore, higher channel accuracy is necessary for CoMP.

In the case of CoMP JT, several eNBs cooperatively transmit the same data to a specific UE. Accordingly, the CoMP JT may be theoretically considered as a MIMO system in which antennas have been geographically distributed.

That is, in the JT, if MU-MIMO is performed, as in single cell MU-MIMO, channel accuracy of a high level is necessary to avoid interference between co-scheduled UEs.

Furthermore, in the case of CoMP CB, fine channel information is necessary to avoid the interference of a neighbor cell with a serving cell.

Restricted RLM and RRM/CSI Measurement

As one interference coordination method, there is a time domain inter-cell interference coordination in which an aggressor cell uses a silent subframe (may also be called an almost blank subframe (ABS)) for reducing the transmission power/activity of some physical channels (including an operation of setting it as zero power) and a victim cell schedules a UE by considering the above.

In this case, from the standpoint of a victim cell UE, an interference level may greatly vary depending on a subframe.

In this case, in order to perform a radio resource management (RRM) operation of measuring more accurate radio link monitoring (RLM) or RSRP/RSRQ in each subframe or to measure channel state information (CSI) for link adaptation, the monitoring/measurement needs to be restricted to sets of subframes having a uniform interference characteristic.

In the 3GPP LTE system, restricted RLM and RRM/CSI measurement have been defined as follows.

UE Procedure for Reporting Channel State Information (CSI)

Time and frequency resources may be used by a UE in order to report CSI configured with a CQI, PMI and/or RI controlled by an eNB.

For spatial multiplexing, a UE needs to determine an RI corresponding to the number of transmission layers.

In this case, the RI is the same as 1 with respect to transmission diversity.

If a UE has been configured as a transmission mode 8 or 9, it may perform PMI/RI reporting using a higher layer parameter pmi-RI-Report or may not perform PMI/RI reporting.

If a subframe is configured with $c_{CSI,0}$ and $c_{CSI,1}$ in a higher layer, a UE may be configured with resource-restricted CSI measurements.

In this case, the CSI reporting may be periodic or aperiodic.

If a UE is configured in one or more serving cells, it may transmit CSI only in an activated serving cell.

If a UE is not configured for simultaneous PUSCH and PUCCH transmission, as will be described later, the UE needs to periodically report CSI for a PUCCH in a subframe to which a PUSCH has not been allocated.

If a UE is not configured for simultaneous PUSCH and PUCCH transmission, the UE needs to report periodic CSI for the PUSCH of a serving cell having a minimum servcellindex in a subframe in which a PUSCH has been allocated.

In this case, the UE needs to use the same PUCCH-based periodic CSI reporting format for the PUSCH.

If a specified specific condition is satisfied, the UE needs to perform aperiodic CSI reporting through the PUSCH.

Aperiodic CQI/PMI reporting or RI reporting is transmitted only when a CSI feedback type supports the RI reporting.

A set of UE subbands may evaluate CQI reporting corresponding to all downlink system bandwidths.

A subband is a set configured with k PRBs. In this case, k is the function of a system bandwidth.

In the last subband of an S set, the number of contiguous PRBs may be smaller than k depending on $N_{RB}^{DL}$.

The number of system bandwidths given by $N_{RB}^{DL}$ may be defined as $N = \lceil N_{RB}^{DL}/k \rceil$.

Subbands need to be indexed in order that a frequency increases starting from a minimum frequency and in order that a size does not increase starting from a minimum frequency.

Table 4 is a table illustrating subband sizes (k) and the configuration of a system bandwidth.

TABLE 4

| System Bandwidth $N_{RB}^{DL}$ | Subband Size (k) |
|---|---|
| 6-7 | NA |
| 8-10 | 4 |
| 11-26 | 4 |
| 27-63 | 6 |
| 64-110 | 8 |

In LTE, aperiodic CSI (ACSI) reporting is indicated in a UE through downlink control information (DCI) signaling.

Furthermore, the ACSI reporting has been reported at fixed timing (DCI signaling timing+4 subframes) through PUSCH scheduling.

In this case, timing at which a PUSCH is scheduled from UL DCI signaling timing has been considered.

Meanwhile, in a new RAT (NR) standard, a scheme for indicating ACSI reporting timing in a UE has been introduced.

The reason for this is that 1) in the NR, PUSCH scheduling timing has been specified in a UE through DCI and 2) faster CSI feedback can be used if necessary/possible.

Particularly, in the NR, if fast feedback is possible through small CSI calculation under a specific condition (e.g., 2-port type-1 PMI only, wideband CSI only), CSI timing may be indicated in a UE so that the UE can perform reporting to an eNB in time.

In this case, there may be a problem in that a plurality of ACSI reportings is triggered in one UE.

Meanwhile, in LTE, a method of reporting, by a UE, not-updated CSI was sufficient depending on the capability of the UE because ACSI is all reported at the same PUSCH timing Y(=4).

In this case, the Y indicates the location of a subframe(=slot in NR) in which a PUSCH including aperiodic CSI is transmitted to the UE based on a subframe in which DCI including an aperiodic CSI trigger is received.

However, in the NR, different ACSI reporting timing could have been designated, and this may result in a problem.

For example, as in FIG. 5, after specific ACSI (ACSI 1) trigger timing, a different ACSI (ACSI2) trigger is indicated in a UE prior to reporting. Furthermore, there may be a problem in the calculation/reporting of triggered ACSI 1) if the reporting timing of ACSI2 is earlier than the reporting timing of ACSI1 or 2) the reporting timing of ACSI2 overlaps the reporting timing of ACSI1.

Accordingly, the present disclosure proposes the following technology.

Proposal 1. Priority Group for ACSI

Different priority groups may be defined depending on characteristics of ACSI reporting.

Specifically, ACSI using a small Y may be configured to have a higher priority than ACSI using a different value with respect to different CSI timing Y.

For example, since ACSI reporting using the smallest value Y may be configured as a higher-priority group, and ACSI reporting using the remaining Y values may be configured as a low-priority group.

Such a method has an object of calculating/reporting a CSI set not using much processing power of a UE in CSI calculation within a short time, as in a 2-port type-1 PMI only, wideband CSI only or wideband CQI only case.

Accordingly, it is preferred that ACSI reporting having the smallest Y value is configured to have a higher priority than ACSI reporting having a CSI timing Y value longer than that of the ACSI reporting the smallest Y value.

Meanwhile, in contrast, ACSI using a great Y may be configured/defined to have a higher priority than ACSI using a different value with respect to different CSI timing Y.

The reason for this is that if a Y value is long, ACSI reporting for a Y value including smaller information may be less important from the standpoint of an eNB because the y value includes more information.

Furthermore, such a priority group may be configured through each of or a combination signaling/configuration of L3 signaling such as RRC, L2 signaling such as MAC, or L1 signaling such as DCI.

Particularly, such priority group signaling may be included in CDI including a CSI trigger.

In addition, some of or all of pieces of ACSI corresponding to a specific ACSI trigger may be configured in a UE so that they are preferentially calculated/reported.

For example, if a Y value configured as a higher-priority group is set using a method such as RRC and an ACSI trigger is actually performed through DCI, a priority for corresponding ACSI may be indicated using a method of indicating a specific Y value within the same DCI.

Alternatively, an eNB may provide a UE with a kind of 'high-priority ACSI trigger' signaling without a separate configuration so that corresponding ACSI reporting is prioritized over previously triggered ACSI and calculated/reported.

Furthermore, a different priority may be configured depending on a reporting channel of ACSI.

Specifically, ACSI configured to be reported in a PUCCH may have a higher priority than ACSI configured to be reported in a PUSCH.

Furthermore, ACSI configured to be reported in a short-PUCCH may have a higher priority than ACSI configured to be reported in a long-PUCCH.

Such a priority may be configured/defined differently from a periodic and/or semi-persistent CSI report.

Alternatively, a priority group may be configured depending on the reporting content of CSI.

That is, the greatest portion in the CSI calculation time is rank indication/precoding matrix indicator (RI/PMI) calculation. Accordingly, if corresponding CSI is subtracted, in other words, a case where a PMI or/and RI are fed back and if not (e.g., CQI only case), the latter may have a priority higher than the former.

In other words, a case where only a CQI not an RI/PMI is reported may have a higher priority.

Furthermore, if CSI for a CSI-RS resource of a specific port number (e.g., 2 ports) or less is calculated/reported, a smaller calculation time for the corresponding CSI calculation is necessary.

Accordingly, a different priority group may be defined depending on a port number.

Specifically, a case where CSI for a smaller port number or a specific number of ports (e.g., 2) or less is calculated/reported may be configured/defined to have a higher priority a case where CSI is not calculated/reported.

Likewise, wideband CSI may have a higher priority than partial band CSI, and partial band CSI may have a higher priority than subband CSI.

Likewise, ACSI including type-1 CSI may have a higher priority than ACSI including type-2 CSI.

Alternatively, a priority group may be configured in a resource for CSI measurement.

In a non zero power (NZP) CSI-RS based IMR newly introduced into the NR, one resource is measured port-wise, and each port may represent the layer of each desired channel/interference.

CSI for such a resource may have a higher priority because an RI/PMI does not need to be separately calculated.

Furthermore, in the case of a multiple carrier component (CC), in other words, if carriers are aggregated (carrier aggregation case) may be considered.

In other words, among a case where CSI for a plurality of CCs is requested and a case where CSI for a current single serving cell (CC) is requested, the priority of the latter may be configured/defined to be higher.

The reason for this is that in general, CSI for a current serving CC has a close relationship with current operation performance of a UE.

Furthermore, if the number of CCs for CSI calculation is small, the time necessary for the CSI calculation is small. Accordingly, the priority of CSI may be configured/defined depending on the number of CCs.

Specifically, a case where CSI for a smaller number of CCs or a specific number (e.g., 1) of CCs or less is calculated/reported may be configured/defined to have a priority higher than a case where CSI is not calculated/reported.

Such a method may be identically applied even in a bandwidth part (BWP).

For example, among a case where CSI for a plurality of BWPs or a BWP other than a currently activated BWP and a case where CSI for a currently activated BWP is requested, the priority of the latter may be configured/defined to be higher.

The reason for this is that in general, CSI for a currently activated BWP has a close relationship with current operation performance of a UE.

Furthermore, if the number of BWPs for CSI calculation is small, the priority of CSI may be configured/defined depending on the number of BWPs because the time for the CSI calculation is small.

For example, a case where CSI for a smaller number of BWPs or a specific number (e.g., 1) of BWPs or less is calculated/reported may be configured/defined to have a higher priority than a case where CSI is not calculated/reported.

Meanwhile, with respect to ACSI having the same priority group or in which a priority has not been separately configured/defined, the side that has been first triggered may have a higher priority in the aspect that ACSI that has first started calculation is prioritized.

Furthermore, if an eNB transmits an additional ACSI trigger although it is aware of a current situation, this may mean that later triggered CASI is more important compared to previous ACSI reporting.

Accordingly, among all ACSI triggers, the side that has been later triggered may have a higher priority.

Proposal 2. Simultaneous ACSI Calculation Handling According to Priority Groups)

The following methods may be used for each priority group of ACSI configured/defined using the above method.

(Method 1) CSI Relaxation

As in LTE, some of or all of pieces of ACSI indicated to be reported may be reported in the state in which they have not been updated.

In other words, ACSI belonging to a higher-priority group may be updated and reported. Some of or all of pieces of ACSI belonging to a lower-priority group may be reported without being updated.

In this case, if only some CSI are updated, a method of determining not-updated CSI is described later.

In this case, ACSI corresponding to a different priority group may report different CSI (e.g., a CQI only in higher-priority ACSI1, and RI/PMI/CQI reporting in lower-priority ACSI2).

However, in such a case, a CSI relaxation method between different ACSI may not be clear.

Specifically, CSI of ACSI1 may be reported at the reporting timing of ACSI2 without being updated at the reporting timing of the ACSI2.

In this case, an RI/PMI to be reported in the ACSI2 does not include 'not-updated' CSI because it is not previously calculated. Accordingly, a CSI relaxation operation is not clear.

In such a case, CSI included in higher-priority ACSI and lower-priority ACSI in common may be transmitted without being updated.

Furthermore, a CSI parameter (e.g., RI, PMI) not reported in higher-priority ACSI, but reported in lower-priority ACSI may be reported using the following method.

(Method 1-1) Zero Padding

This refers to a method of including and transmitting a meaningless value, such as a zero value.

In such a case, an eNB and a UE define that a corresponding bit(s) does not have a separate meaning.

Furthermore, other meaningless values in addition to a zero may be filled and transmitted.

(Method 1-2) Drop

This refers to a method of not reporting corresponding CSI.

Furthermore, a resource configured to report corresponding CSI is not used, and is used for PUSCH transmission.

Meanwhile, if CSI is piggybacked in a PUSCH, such an operation may provide more resources for a PUSCH by reducing an unnecessary PUSCH rate matching/puncturing operation.

(Method 1-3) Delete, but with Same Payload (if Jointly Encoded)

If corresponding CSI is encoded like reported CSI, a corresponding resource may be used for a lower coding rate for reported CSI instead of zero padding.

Accordingly, the robustness of the reporting of CSI may be additionally provided.

(Method 1-4)

A CSI parameter (e.g., multiple CQIs fora plurality of interference hypotheses) reported in Delete, and higher-priority ACSI, but not reported in lower-priority ACSI may be included in a corresponding payload and reported.

Alternatively, with respect to a case other than Method 1-4, a CSI parameter (e.g., multiple CQIs for a plurality of interference hypotheses) reported in higher-priority ACSI, but not reported in lower-priority ACSI may not be reported.

(Method 2) ACSI Drop

The greatest reason why ACSI is triggered at different timing is for reporting, to an eNB, specific CSI at faster timing for fast channel adaptation (calculation is easy).

Accordingly, in order to guarantee CSI calculation processing power, a higher-priority group may calculate and report ACSI, and some of or all of pieces of ACSI belonging to a low-priority group may not be calculated/reported.

In this case, if only some CSI is dropped, a method of determining not-dropped CSI is described later.

Particularly, such a method can also solve the ambiguity of additional resource allocation if a reporting timing collision to be described later (if all pieces of ACSI are dropped) (reporting timing collision case) occurs.

(Method 3) ACSI Reporting Timing Delay

In order to first perform the calculation of ACSI belonging to a higher-priority group and to then perform the calculation of ACSI belonging to a lower-priority group, reporting timing of some of or all of pieces of the ACSI belonging to a lower-priority group may be more delayed than timing designed through a corresponding ACSI trigger.

Specifically, if the priority of ACSI for a preceding trigger is low, corresponding ACSI reporting timing may be determined by adding reporting timing of subsequent higher-priority ACSI(s).

Such a method is a method used to separately secure the time necessary for the calculation of higher-priority ACSI.

For example, with respect to the reporting timing Y1 of ACSI1 belonging to a higher priority and the reporting timing Y2 of ACSI2 belonging to a lower-priority group, the ACSI2 may be triggered in a slot m and the ACSI1 may be triggered in a slot n (m<n<($\leq$)(m+Y2)).

In this case, the reporting timing of some of or all of pieces of ACSI2 may become m+Y1+Y2 not m+Y2 by adding a calculation time Y1 for ACSI1 to the existing m+Y2.

Meanwhile, in order to discard a calculation process for lower-priority ACSI calculated in a conventional technology and to first perform the calculation of higher-priority ACSI, the priority of ACSI fora preceding trigger may be low.

In this case, in corresponding ACSI reporting timing, timing at which the calculation/reporting of subsequent higher-priority ACSI(s) is ended may be determined as a new reference point.

This is for securing a buffer for the CSI calculation of a UE.

FIG. 6 is a diagram illustrating an example of a case where ACSI reporting timing is delayed, which is proposed in the present disclosure.

For example, referring to FIG. 6, the reporting timing of ACSI2 may be n+Y1+Y2 not m+Y1+Y2.

In addition to the above method, by considering the time necessary for the switching of a buffer state, an offset value y may be additionally configured (e.g., n+Y1+Y2→n+Y1+Y2+y).

In this case, the corresponding y value may be preset or may be reported to an eNB as a UE capability.

For clearer signaling, in the above case, a new Y value for ACSI that has been previously triggered may be transmitted to a UE through explicit signaling such as DCI.

This may be transmitted through subsequent ACSI triggering DCI (i.e., UE-specific UL DCI) or DCI (e.g., cell-common DCI) having a different format using a separate RNTI.

The aforementioned method may be differently configured with respect to a relationship between priority groups, particularly, between the same priority groups/different priority groups.

For example, different priority groups perform the ACSI reporting timing delay method of Method 3, but the same priority groups may use the ACSI not update method of Method 1.

Furthermore, such a method may be applied between the same ACSI, but may be likewise configured/defined between different timing behaviors, in other words, aperiodic/semi-persistent/periodic CSI and used.

Furthermore, the application to the same priority groups may be differently defined/configured depending on each priority group.

For example, an ACSI group for a smaller Y value may use the ACSI drop of Method 2. In contrast, an ACSI group using a normal Y value may use the CSI relaxation of Method 1.

The reason for this is that a separate configuration for a corresponding purpose is advantageous because it is preferred that an ACSI group for a smaller Y value guarantees processing power for ACSI calculation.

When the aforementioned method is applied to some of pieces of CSI, a priority between the pieces of CSI may be defined.

If NR CSI is reported in a PUSCH, part 2 information bits of a partial subband may be omitted.

While NR CSI is reported in a PUSCH, part 2 information bits of partial subbands may be omitted.

A rule and omission granularity in which some of part 2 whose priority level is from a Box #0 to a Box #2 and from a high place to a low place is omitted are one box as illustrated in FIG. 7.

N is the number of CSI reportings in one slot.

The number of CSI reportings corresponds to a CSI reporting configuration.

In the present disclosure, a method for CQI calculation is selected below.

Method 1: a CQI for each omitted subband is calculated assuming a PMI in the closest subband having part 2 reporting.

Method 2: a CQI for each omitted subband is calculated assuming the PMI of a subband.

The aforementioned part 1/part 2 CSI are as follows.

Type 1: only single-slot reporting

CSI reporting may be configured as a maximum of 2 parts.

Part 1: an RI/CRI, CQI for the first codeword (CW)

Part 2: an PMI, CQI (when RI>4) for the second CW

Type 2:

CSI reporting may be configured with a maximum of 2 or 3 parts (to be down selected in RAN1 NR-AH3).

If 3 parts are supported, the part 1 may indicate an RI, CQI for the first OW; the part 2 may indicate wideband amplitude information; and the part 3 may indicate a PMI.

In resource allocation for CSI reporting, a payload difference between RI=1 and RI=2 needs to be considered. Both single slot reporting and multi-slot reporting need to be considered.

A single slot reporting principle (CSI parameter in reporting in multiple slots are not multiplexing)

When the aforementioned method (e.g., CSI relaxation/drop/delay method) is used, it may be identically applied to some of or all priorities between the pieces of part2 CSI.

For example, only a priority such as CSI wideband (WB) CSI>subband (SB) CSI, among priorities between the pieces of part2, may be applied.

Or/and a priority between different CSI part, such as part 1 CSI>part 2 CSI, may be applied.

Furthermore, reporting having a small reporting setting ID between the same CSI parts may be configured/defined to have a higher priority.

In addition, the aforementioned drop may be applied depending on a CC.

In other words, CSI for a serving CC may have the highest priority.

Furthermore, a different priority (e.g., in increasing order) may be configured/defined based on cc index (except a serving cell).

For example, if CCs 0~7 have been configured in a UE and the serving CC of the corresponding the UE is the CC3, a priority rule may be configured/defined like CC3>CC0>CC1>CC2>CC4> . . . >CC7.

The above method may be identically applied to a bandwidth part (BWP). In such a case, in the aforementioned drop, a CC may be prioritized over a BWP.

That is, after the priority rule for a CC is first applied, the priority rule for a BWP may be applied.

The above method may be pre-configured or may be configured by each of or a combination of L3 signaling such as RRC, L2 signaling such as MAC and/or L1 signaling such as DCI for flexibility.

Operation processes performed by a UE and eNB that perform a method of reporting aperiodic channel state information (ACSI) proposed in the present disclosure are described with reference to FIGS. 8 to 13.

First, the UE receive, from the eNB, downlink control information (DCI) including the reporting trigger of each of first ACSI and second ACSI and reporting timing of each of the first ACSI and second ACSI (S810).

Thereafter, the UE determines a priority based on a predetermined rule between the first ACSI and the second ACSI (S820).

In this case, the UE may use the aforementioned method as a method of determining the priority.

Thereafter, the UE reports, to the eNB, high-priority ACSI of the first ACSI and the second ACSI determined based on the predetermined rule at the reporting timing (S830).

In this case, the aforementioned method may be used as a method of delaying the reporting timing.

Next, the UE delays the reporting timing of low-priority ACSI of the first ACSI and the second ACSI determined based on the predetermined rule, and determines the delayed reporting timing as reporting timing (S840).

Thereafter, the UE reports the low-priority ACSI to the eNB at the determined reporting timing (S850).

In this case, the reporting timing of each of the first ACSI and the second ACSI indicates time up to a subframe or slot in which a physical uplink shared channel (PUSCH) for reporting ACSI is transmitted based on a subframe or slot in which the reporting trigger of each of the first ACSI and the second ACSI is received.

In this case, the UE performing the method may be as follows.

The UE may be configured to include a radio frequency (RF) module for transmitting and receiving radio signals and a processor functionally connected to the RF module.

In this case, the processor may receive, from an eNB, downlink control information (DCI) including the reporting trigger of each of first ACSI and second ACSI and reporting timing of each of the first ACSI and second ACSI.

Furthermore, the processor may determine a priority based on a predetermined rule between the first ACSI and the second ACSI.

Furthermore, the processor may perform a function for reporting, to the eNB, high-priority ACSI of the first ACSI and the second ACSI, determined by the predetermined rule, at the reporting timing.

Furthermore, the processor may delay the reporting timing of low-priority ACSI of the first ACSI and the second ACSI determined based on the predetermined rule, and may determine the delayed reporting timing as reporting timing.

In this case, the reporting timing of each of the first ACSI and the second ACSI indicates time up to a subframe or slot in which a physical uplink shared channel (PUSCH) for reporting ACSI is transmitted based on a subframe or slot in which the reporting trigger of each of the first ACSI and the second ACSI is received.

FIG. 9 is a diagram illustrating an example of an operating method of an eNB receiving aperiodic CSI, which is proposed in the present disclosure.

First, the eNB transmits, to a UE, downlink control information (DCI) including the reporting trigger of each of first ACSI and second ACSI, reporting timing of each of the first ACSI and second ACSI (S910).

Next, the eNB receives, from the UE, low-priority ACSI of the first ACSI and the second ACSI, determined based on a predetermined rule, at reporting timing determined based on delayed reporting timing (S920).

In this case, the eNB performing the method may be as follows.

The eNB may be configured to include a radio frequency (RF) module for transmitting and receiving radio signals and a processor functionally connected to the RF module.

In this case, the processor may transmit, to a UE, downlink control information (DCI) including the reporting trigger of each of first ACSI and second ACSI and reporting timing of each of the first ACSI and second ACSI.

In addition, the processor may receive, from the UE, the low-priority ACSI of the first ACSI and the second ACSI, determined based on a predetermined rule, at reporting timing determined based on delayed reporting timing.

Proposal 3. Reporting Resource Collision Handling According to Priority Groups

There may be a case where PUSCH reporting timing for two or more pieces of ACSI overlap and one or more pieces of CSI to be reported are present in two or more pieces of ACSI.

In such a case, ambiguity may occur regarding how each piece of ACSI has to be reported using which one of pieces of signaling related to PUSCH transmission, such as resource allocation from two pieces of DCI.

A detailed method for solving this problem is described later.

(Method 1) Aggregated Report

This is a method of aggregating some of or all of pieces of ACSI to be reported at corresponding timing and reporting the ACSI.

In the aggregation of CSI, pieces of CSI are contiguously allocated in the same manner as the sequence of the priorities of ACSI.

Specifically, pieces of ACSI information may be mapped with a higher-priority first and a lower-priority last.

This may be applied to each of CSI groups that are independent encoded.

For example, pieces of CSI may be aggregated and encoded with respect to part 1 CSI and part 2 CSI.

Meanwhile, in the resource allocation aspect, one of piece of DCI including an ACSI trigger may be followed.

Specifically, aggregated CSI may be reported using signaling information, such as resource allocation/MCS included in UL DCI including the trigger of ACSI having the highest priority.

In this case, a payload size may be insufficient in reporting all of pieces of aggregated ACSI. Accordingly, some information may be dropped.

Furthermore, which CSI will be dropped may be determined based on a priority between pieces of CSI. A priority between pieces of CSI information within ACSI for this may be configured/defined as in Method 2 of Proposal 2 (e.g., part 1 CSI>part 2 CSI).

(Method 2) ACSI Drop

A UE may calculate and report ACSI belonging to a higher-priority group, and may not report all of pieces of ACSI belonging to a low-priority group.

In this case, unlike in Method 1, all of pieces of specific CSI are dropped regardless of whether resources are sufficient/insufficient.

Method 2 has an advantage in that a method of using the signaling of each piece of DCI in ACSI reporting may become clear in addition to a clear calculation time secured.

UL transmission information, such as resource allocation/MCS, designated in DCI including the trigger of ACSI that is actually transmitted without being dropped, is used as information, such as resource allocation/MCS for ACSI reporting.

(Method 3) ACSI Reporting Timing Delay

A UE may more delay reporting timing of ACSI belonging to a lower-priority group than timing designated through a corresponding ACSI trigger.

Specifically, if the priority of ACSI for a preceding trigger is low, it may be determined by adding reporting timing of a higher-priority ACSI(s).

For example, if ACSI2 has been triggered in a slot m and ACSI1 has been triggered in a slot n (m<n<($\leq$)(m+Y2)) with respect to reporting timing Y1 of ACSI1 belonging to a higher priority and reporting timing Y2 of ACSI2 belonging to a lower-priority group, reporting timing of some of or all of pieces of the ACSI2 may become m+Y1+Y2 not m+Y2.

Alternatively, in order to discard the existing calculation process for the ACSI2 and to first perform the calculation of the ACSI1, the reporting timing of the ACSI2 may become n+Y1+Y2 not m+Y1+Y2.

Such a method has an advantage in that a method in which the signaling of DCI is used in ACSI reporting can become clear in addition to the clear securing of a calculation time and has an advantage in that all of pieces of triggered ACSI may be received (with delay).

In such a case, the remaining information of the DCI may be used without any change, and an ACSI timing Y value may be redefined (overridden) by the aforementioned method depending on a collision against a priority.

The application of the aforementioned method may be differently configured based on a relationship between priority groups, particularly, between the same priority groups/different priority groups.

For example, different priority groups perform the ACSI reporting timing delay of Method 3, but the same priority groups may use the ACSI not update method of Method 1.

Furthermore, such a method is applied between the same ACSIs, and may be similarly configured/defined between different timing behaviors, in other words, between pierces of aperiodic/semi-persistent/periodic CSI and used.

This method may be configured/operated separately from the operation described in Proposal 2.

For example, in the simultaneous ACSI calculation aspect, the ACSI drop method of Method 2 described in Proposal 2 may be used.

However, pieces of reporting timing of (not dropped) some of or all of pieces of ACSI may overlap.

In this case, the method of reporting aggregated CSI of Method 1 described in Proposal 3 may be used.

Furthermore, the method described in the present disclosure may be differently applied based on a relationship between pieces of CSI timing.

Specifically, a priority group may have been defined depending on CSI reporting timing Y.

In this case, in the situation in which a different ACSI (ACSI2) trigger is indicated in a UE after specific ACSI (ACSI 1) trigger timing/before reporting, different methods may be applied to a case where reporting timing of later triggered ACSI (e.g., ACSI2) is equal to or earlier than reporting timing of first triggered ACSI (e.g., ACSI1) and a case where the reporting timing of the later triggered ACSI (e.g., ACSI2) is not equal to or earlier than the reporting timing of the first triggered ACSI (e.g., ACSI1).

Furthermore, the method described in the present disclosure may be in general applied to the collision of UL transmission timing if common PUSCH/PUCCHs or/and different channels are used.

A different priority group for this is may be configured as follows.

Other PUCCH>PUCCH with CSI only>PUSCH for data and CSI>PUSCH for data>PUSCH for CSI only In the contents proposed in the present disclosure, a case where CSI reporting timing is reversed or a collision occurs (collision case) is taken as a major example, but the disclosure is not limited to such a situation.

In addition, when the above technology is actually applied, the above technology may be applied solely or in combination.

Furthermore, in the aforementioned method, the proposed method based on the 3GPP New RAT system has been described, for convenience of description, but the range of a system to which the proposed method is applied may be extended to different systems (e.g., LTE and UTRA), particularly, 5G and candidate technologies thereof in addition to the 3GPP New RAT system.

General Apparatus to which the Present Disclosure may be Applied

FIG. 10 illustrates a block diagram of a wireless communication apparatus to which methods proposed in the present disclosure may be applied.

Referring to FIG. 10, a wireless communication system includes an eNB 1010 and a plurality of user equipments 1020 disposed within the area of the eNB 1010.

The eNB and the UE may be represented as wireless devices, respectively.

The eNB 1010 includes a processor 1011, a memory 1012 and a radio frequency (RF) module 1013.

The processor 1011 implements the function, process and/or method proposed in FIGS. 1 to 9. The layers of a radio interface protocol may be implemented by the processor. The memory 1012 is connected to the processor, and stores various pieces of information for driving the processor. The RF module 1013 is connected to the processor, and transmits and/or receives a radio signal.

The UE 1020 includes a processor 1021, a memory 1022 and an RF module 1023.

The processor 1021 implements the function, process and/or method proposed in FIGS. 1 to 9. The layers of a radio interface protocol may be implemented by the processor. The memory 1022 is connected to the processor, and stores various pieces of information for driving the processor. The RF module 1023 is connected to the processor, and transmits and/or receives a radio signal.

The memory 1012, 1022 may be positioned inside or outside the processor 1011, 1021 and may be connected to the processor 1011, 1021 by various well-known means.

Furthermore, the eNB 1010 and/or the UE 1020 may have a single antenna or multiple antennas.

FIG. 11 illustrates a block diagram of a communication apparatus according to an embodiment of the present disclosure.

Particularly, FIG. 11 is a diagram illustrating the UE of FIG. 10 more specifically.

Referring to FIG. 11, the UE may include a processor (or digital signal processor (DSP)) 1110, an RF module (or RF unit) 1135, a power management module 1105, an antenna 1140, a battery 1155, a display 1115, a keypad 1120, a memory 1130, a subscriber identification module (SIM) card 1125 (this element is optional), a speaker 1145, and a microphone 1150. Furthermore, the UE may include a single antenna or multiple antennas.

The processor 1110 implements the function, process and/or method proposed in FIGS. 1 to 9. The layers of a radio interface protocol may be implemented by the processor.

The memory 1130 is connected to the processor, and stores information related to the operation of the processor. The memory 1130 may be positioned inside or outside the processor and may be connected to the processor by various well-known means.

A user inputs command information, such as a telephone number, by pressing (or touching) a button of the keypad 1120 or through voice activation using the microphone 1150, for example. The processor receives such command information and performs processing so that a proper function, such as making a phone call to the telephone number, is performed. Operational data may be extracted from the SIM card 1125 or the memory. Furthermore, the processor may display command information or driving information on the display 1115 for user recognition or convenience.

The RF module 1135 is connected to the processor and transmits and/or receives RF signals. The processor delivers command information to the RF module so that the RF module transmits a radio signal that forms voice communication data, for example, in order to initiate communication. The RF module includes a receiver and a transmitter in order to receive and transmit radio signals. The antenna 1140 functions to transmit and receive radio signals. When a radio signal is received, the RF module delivers the radio signal so that it is processed by the processor, and may convert the signal into a baseband. The processed signal may be converted into audible or readable information output through the speaker 1145.

FIG. 12 is a diagram illustrating an example of the RF module of a wireless communication apparatus to which a method proposed in the present disclosure may be applied.

Specifically, FIG. 12 shows an example of an RF module that may be implemented in a frequency division duplex (FDD) system.

First, in a transmission path, the processor described in FIGS. 10 and 11 processes data to be transmitted and provides an analog output signal to a transmitter 1210.

In the transmitter 1210, the analog output signal is filtered by a low pass filter (LPF) 1211 in order to remove images caused by digital-to-analog conversion (ADC). The signal is up-converted from a baseband to an RF by a mixer 1212 and is amplified by a variable gain amplifier (VGA) 1213. The amplified signal is filtered by a filter 1214, additionally amplified by a power amplifier (PA) 1215, routed by a duplexer(s) 1250/antenna switch(es) 1260, and transmitted through an antenna 1270.

Furthermore, in a reception path, the antenna 1270 receives signals from the outside and provides the received signals. The signals are routed by the antenna switch(es) 1260/duplexers 850 and provided to a receiver 1220.

In the receiver 1220, the received signals are amplified by a low noise amplifier (LNA) 1223, filtered by a band pass filter 1224, and down-converted from the RF to the baseband by a mixer 1225.

The down-converted signal is filtered by a low pass filter (LPF) 1226 and amplified by a VGA 1227, thereby obtaining the analog input signal. The analog input signal is provided to the processor described in FIGS. 10 and 11.

Furthermore, a local oscillator (LO) 1240 generates transmission and reception LO signals and provides them to the mixer 1212 and the mixer 1225, respectively.

Furthermore, a phase locked loop (PLL) 1230 receives control information from the processor in order to generate transmission and reception LO signals in proper frequencies, and provides control signals to the local oscillator 1240.

Furthermore, the circuits shown in FIG. 12 may be arrayed differently from the configuration shown in FIG. 11.

FIG. 13 is a diagram illustrating another example of the RF module of a wireless communication apparatus to which a method proposed in the present disclosure may be applied.

Specifically, FIG. 13 shows an example of an RF module that may be implemented in a time division duplex (TDD) system.

The transmitter 1310 and receiver 1320 of the RF module in the TDD system have the same structure as the transmitter and receiver of the RF module in the FDD system.

Hereinafter, only a different structure between the RF module of the TDD system and the RF module of the FDD system is described. Reference is made to the description of FIG. 12 for the same structure.

A signal amplified by the power amplifier (PA) 1315 of the transmitter is routed through a band select switch 1350, a band pass filter (BPF) 1360 and an antenna switch(es) 1370 and is transmitted through an antenna 1380.

Furthermore, in a reception path, the antenna 1380 receives signals from the outside and provides the received signals. The signals are routed through the antenna switch(es) 1370, the band pass filter 1360 and the band select switch 1350 and are provided to the receiver 1320.

In the embodiments described above, the components and the features of the present disclosure are combined in a predetermined form. Each component or feature should be considered as an option unless otherwise expressly stated. Each component or feature may be implemented not to be associated with other components or features. Furthermore, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of an implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of an implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

The method of reporting aperiodic channel state information in a wireless communication system according to the present disclosure has been illustrated as being applied to a 3GPP LTE/LTE-A system, 5G system (new RAT system), but may be applied to various other wireless communication systems.

The invention claimed is:

1. A method of reporting aperiodic channel state information (ACSI) in a wireless communication system, the method performed by a terminal comprising:
   receiving, from a base station, downlink control information (DCI) including (i) a reporting trigger for each of first ACSI and second ACSI and (ii) information related to reporting timing for each of the first ACSI and second ACSI;
   determining a priority for the first ACSI and the second ACSI based on a predetermined rule; and
   reporting, to the base station, (i) the first ACSI and (ii) the second ACSI determined based on (i) the predetermined rule and (ii) the reporting timing,
   wherein, based on the first ACSI and the second ACSI colliding, a reporting timing for a low-priority ACSI, among the first ACSI and the second ACSI that is determined based on the predetermined rule, is determined to be a timing which is delayed from the reporting timing, that is determined based on the information related to the reporting timing included in the DCI for the low-priority ACSI, by a timing offset (i) from a subframe or a slot in which the DCI for high-priority ACSI is received (ii) to a subframe or a slot in which a physical uplink shared channel (PUSCH) for reporting the high-priority ACSI is transmitted.

2. A terminal performing a method of reporting aperiodic channel state information (ACSI) in a wireless communication system, the terminal comprising:
   a radio frequency (RF) module for transmitting and receiving radio signals; and
   a processor functionally connected to the RF module,
   wherein the processor is configured to:
   receive, from a base station, downlink control information (DCI) including (i) a reporting trigger for each of first ACSI and second ACSI and (ii) information related to reporting timing for each of the first ACSI and second ACSI;

determine a priority for the first ACSI and the second ACSI based on a predetermined rule; and report, to the base station, (i) the first ACSI and (ii) the second ACSI determined based on (i) the predetermined rule and (ii) the reporting timing, wherein, based on the first ACSI and the second ACSI colliding, a reporting timing for a low-priority ACSI, among the first ACSI and the second ACSI that is determined based on the predetermined rule, is determined to be a timing which is delayed from the reporting timing, that is determined based on the information related to the reporting timing included in the DCI for the low-priority ACSI, by a timing offset (i) from a subframe or a slot in which the DCI for high-priority ACSI is received (ii) to a subframe or a slot in which a physical uplink shared channel (PUSCH) for reporting the high-priority ACSI is transmitted.

3. A method of reporting aperiodic channel state information (ACSI) in a wireless communication system, the method performed by a base station comprising:

transmitting, to a terminal, downlink control information (DCI) including (i) a reporting trigger for each of first ACSI and a second ACSI and (ii) information related to reporting timing for each of the first ACSI and the second ACSI; and receiving, from the terminal, the first ACSI and the second ACSI determined based on (i) a predetermined rule related to determining a priority by the terminal and (ii) the reporting timing, wherein, based on the first ACSI and the second ACSI colliding, a reporting timing for a low-priority ACSI, among the first ACSI and the second ACSI that is determined based on the predetermined rule, is determined to be a timing which is delayed from the reporting timing, that is determined based on the information related to the reporting timing included in the DCI for the low-priority ACSI, by a timing offset (i) from a subframe or a slot in which the DCI for high-priority ACSI is received (ii) to a subframe or a slot in which a physical uplink shared channel (PUSCH) for reporting the high-priority ACSI is transmitted.

* * * * *